Aug. 29, 1950  F. R. HIGLEY  2,520,399
PILOT BURNER AND THERMALLY
CONTROLLED VALVE THEREFOR
Filed April 29, 1944  2 Sheets-Sheet 1

INVENTOR.
FRANK R. HIGLEY
BY
Kwis Hudson Boughton & Williams
ATTORNEYS

Aug. 29, 1950
F. R. HIGLEY
PILOT BURNER AND THERMALLY CONTROLLED VALVE THEREFOR
2,520,399
Filed April 29, 1944
2 Sheets-Sheet 2
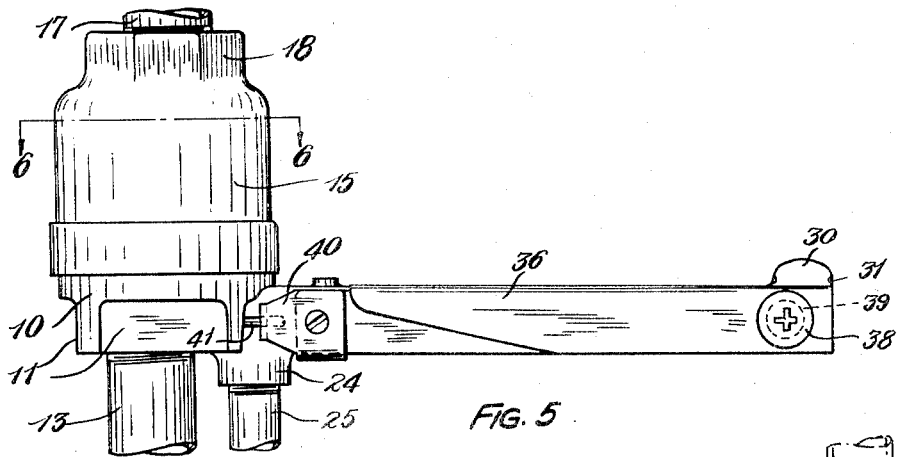
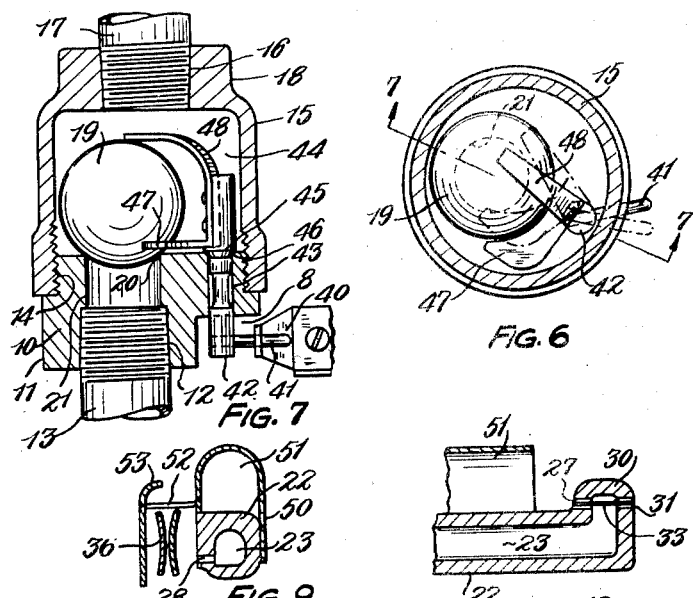
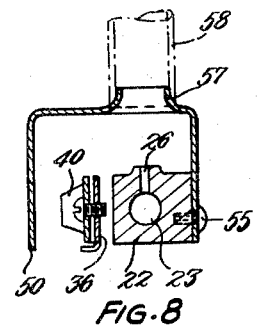
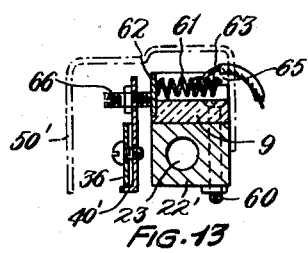
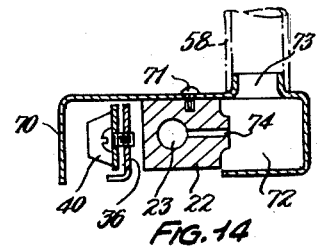
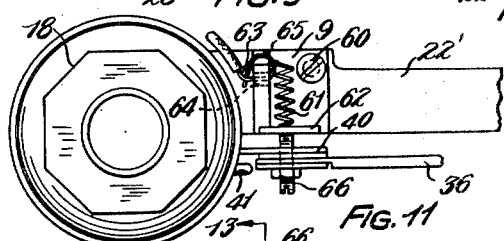
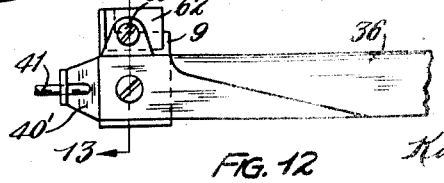
INVENTOR.
FRANK R. HIGLEY
BY
Kwis Hudson Boughton & Williams
ATTORNEYS Patented Aug. 29, 1950

2,520,399

UNITED STATES PATENT OFFICE 2,520,399

PILOT BURNER AND THERMALLY CONTROLLED VALVE THEREFOR

Frank R. Higley, Cleveland Heights, Ohio, assignor, by mesne assignments, to Affiliated Gas Equipment, Inc., Cleveland, Ohio, a corporation of Delaware Application April 29, 1944, Serial No. 533,309

2 Claims. (Cl. 158—117.1)

1

This invention relates to burner controls, more particularly controls embodying pilots and thermal members responsive to pilot flame for controlling oven burners or the like. Obviously the pilot must be close to the burner. The thermally responsive member which is actuated by the pilot must therefore be close to the burner also. Consequently, if the safety valve which controls the fuel supply for the oven burner and is actuated by the thermally responsive member is located more or less remotely from the burner in order to be least affected by the heat, then it must be operated by remote control, as, for example, by mechanical linkage. On the other hand, if the valve is located near the burner in order to permit direct and simple control, then the valve must be capable of functioning properly in a hot spot.

The apparatus of the present invention is of the latter type, and the valve is designed and constructed to function uniformly under high temperature conditions.

One of the objects of the invention is the provision of a valve which will operate without springs.

Another object is the provision of a valve, a thermally responsive member and valve actuating connections such that at times when the thermal member is highly heated, and consequently in a weakened condition, the load which it is called upon to carry shall be light.

A further object is the provision of simplified, convenient, and safe means for igniting pilot gas.

Another object is the provision of a simplified thermal pilot unit, employing a minimum number of parts and requiring a minimum number of assembly and installation operations.

Still another object is the provision of a unit of the character described which shall be of universal adaptability for range oven and other applications.

Other objects and features of novelty will appear as I proceed with the description of those embodiments of the invention which, for the purposes of the present application, I have illustrated in the accompanying drawings in which.

Figure 1:
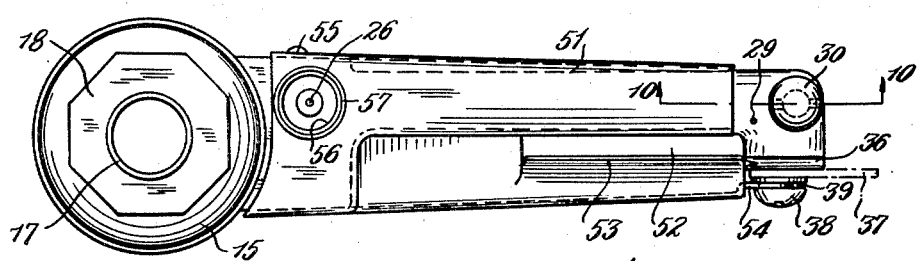
Fig. 1 is a top plan view of an assembly of parts embodying the invention.
Figure 2:
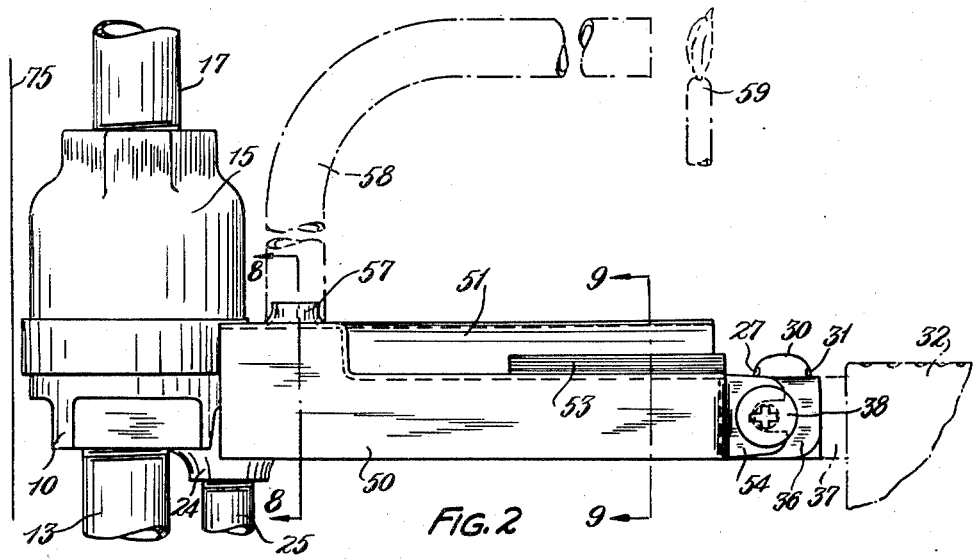
Fig. 2 is an elevational view of the same, one installation of the unit with respect to an oven wall and an oven burner being indicated and one means for igniting pilot gas being shown diagrammatically.
Figure 3:
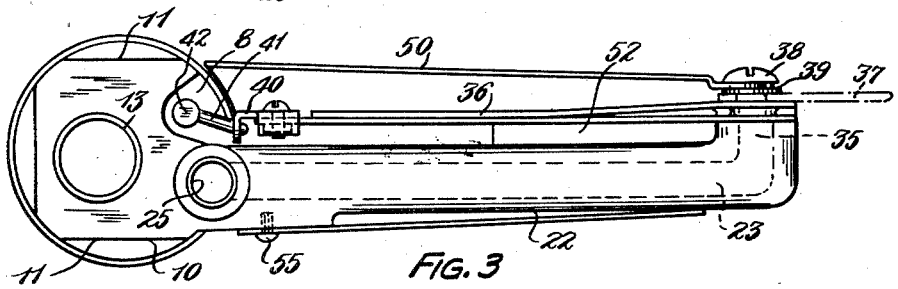
Fig. 3 is a bottom plan view.

2 housing removed and certain parts shown in section;

Fig. 5 is an elevational view with the housing removed;

Fig. 6 is a plan view of the safety valve with the casing in horizontal section, the view being taken substantially along the line 6—6 of Fig. 5;

Fig. 7 is an elevational view partly in vertical section along the line 7—7 of Fig. 6;

Fig. 8 is a vertical sectional detail view taken substantially along the line 8—8 of Fig. 2;

Fig. 9 is a vertical sectional detail view taken substantially along the line 9—9 of Fig. 2;

Fig. 10 is a fragmental vertical sectional view taken substantially along the line 10—10 of Fig. 1;

Fig. 11 is a fragmental plan view of a modified form of the invention in which ignition of the pilot gas is effected electrically;

Fig. 12 is a side view of a portion of the construction illustrated in Fig. 11;

Fig. 13 is a detail vertical sectional view taken substantially on the line 13—13 of Fig. 12, the sheet metal housing being shown in broken lines; and Fig. 14 is a view similar to Fig. 8, but showing the flash tube disposed to one side rather than above the pilot arm.

In the drawing the body of a valve casing is shown at 10. It may be formed with flat faces 11 to receive a wrench and has a threaded bore 12 for the reception of a gas conductor 13. The body 10 of this casing has a circular threaded upper portion 14 which receives the internally threaded lower end of a cap 15 which is circular in contour and is closed at the top except for a threaded bore 16 which receives the threaded extremity of a gas conductor 17. The cap 15 is preferably formed with a hex 18 at its upper extremity in order that a wrench may be applied to it conveniently.

The flow of gas between the conductors 13 and 17 is controlled by a valve ball 19 cooperating with a seat 20 formed at the upper end of a smooth bore 21 in communication with the conductor 13.

Extending laterally from the body 10 of the valve casing there is a pilot arm 22, preferably cast integral with the valve body. This arm may constitute merely a support for a pilot gas conductor, but preferably it is cored out, as indicated in the drawing, to form a passage 23 for pilot gas, and thus constitute a pilot tube. A hollow boss 24 depending from valve body 10 is in communication with passage 23 and is internally threaded to receive a gas tube 25 by means of which pilot gas is supplied to the unit ahead of the safety valve.

Figure 4:
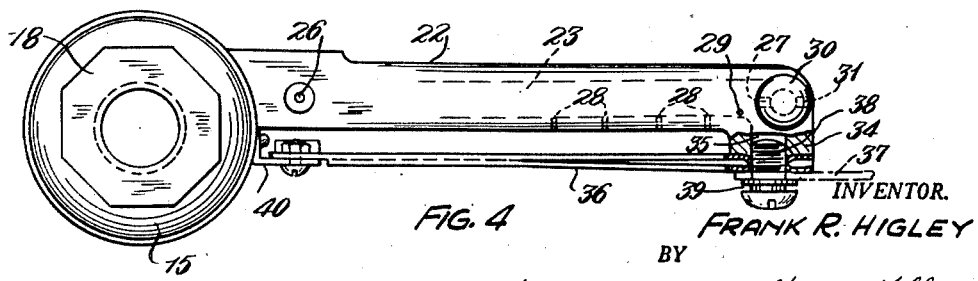
Fig. 4 is a top plan view with the sheet metal

A port 26 for pilot gas is positioned near the mounted end of the pilot arm, and another port 27, hereinafter called a flash port, is positioned near the outer end of the arm. These ports may be supplied with pilot gas from the same conductor as herein shown, the ports 26 and 27 being both connected with the gas passage 23. For the purpose of supplying flame for heating a thermally responsive member, presently to be described, the pilot tube may also have one or more ports 28, Figs. 4 and 9, and a port 29 for transferring flame from port 27 to the nearest port 28.

It will be noted that port 27 is formed in a small dome 30 at the extremity of the pilot tube the interior of which is in communication with the passage 23 as shown in Fig. 10. In this dome and diametrically opposite to port 27 there is another port 31 which is adapted to serve the oven burner, a fragment of which is illustrated at 32 in Fig. 2. The two ports 31 and 27 are formed in a single drilling operation. They are connected by a slot port 33 which may be formed as a saw kerf through one side of the dome.

The free end of pilot tube 22 has a right-angular extremity 34 having a cored hole 35 in communication with gas passage 23. Against the face of this extremity I mount one end of a thermally responsive member 36 of the compensated deflecting type, such as disclosed in my Patent No. 2,487,968 issued November 15, 1949. This thermal member has a hole therethrough of the same diameter as the hole 35. A bracket 37 for attaching the pilot arm or tube to an oven burner also has an opening therethrough of the same diameter as hole 35. These two parts 36 and 37 are secured in position and the hole 35 is closed by a single screw 38, the hole 35 being threaded to receive it. It will be understood, of course, that the particular form and proportions of the bracket 37 will vary with different installations of the unit. The head of screw 38 has a peripheral groove 39 cut therein for a purpose which will presently appear.

The free end of thermally responsive member 36 may have a right-angle clip 40 attached thereto, in one part of which there is a perforation for loosely receiving a pin 41 which constitutes the driven arm of an oscillating actuator for the safety valve. 42 is the rock shaft of this actuator, which extends through a vertical bore 43 in the body 10 and up into the chamber 44 of that valve, its lower end being protected by the walls of a recess 8 in the lower part of the body. A shoulder 45 on rock shaft 42 engages a smooth surface 46 of complementary shape in the top of body 10 in order that a gastight seal may be had when these complementary surfaces are in close engagement.

This oscillating actuator has two ball engaging arms within chamber 44, formed preferably of a single piece of sheet metal. One of these arms 47 is disposed flatwise in a plane at right angles to the shaft 42 at an elevation such that it engages the ball 19 below the center thereof. The other arm 48 extends for a portion of its length longitudinally of shaft 42 and is there secured to a flattened part of that shaft. It is then curved upwardly and inwardly of the valve chamber so that its free extremity lies flatwise in a plane parallel to the arm 47. When the ball is seated and the actuator is in normal position, corresponding to the "cold" position of thermally responsive member 36, the free extremity of arm 48 either engages or stands directly above the ball, as shown in Figs. 6 and 7. Preferably, however, the arm 48 is made resilient, and in the position shown exerts a slight pressure tending to hold the ball to its seat.

In the "cold" position, the arm 47 is entirely out of engagement with the ball. When the thermally responsive member 36 is heated by flame from the pilot tube, actuator shaft 42 swings in the clockwise direction as viewed in Fig. 6 until the top of the arm comes into engagement with the ball. This preliminary movement is enough to carry arm 48 out of the way. Further movement of the actuator in the same direction then causes arm 47 to exert a lifting action upon the ball, which tilts it up over the edge of its seat opposite the application of force by arm 47. The positions of arms 47 and 48 corresponding to the "hot" position of the thermally responsive member are illustrated in broken lines in Fig. 6. The degree of the valve opening movement may vary to whatever extent different operating conditions dictate, that is to say, more or less overthrow of the actuator on the valve opening movement is permitted. It will be observed also that the greatest effort required for opening the valve must be exerted when the arm 47 first engages the ball and lifts it out of its seat. This occurs before the thermally responsive member 36 becomes materially weakened by heat.

When the pilot is extinguished and the thermally responsive member 36 cools, the actuator shaft 42 swings counter-clockwise and arm 46 moves from the broken line position toward the full line position, permitting gravity to return the ball to its seat. If anything should interfere with this gravity return, however, arm 48 will presently engage the ball, which is at that time still elevated above its position of Fig. 7, and will roll it over into its seat. The ball can at no time get out of control because its movements are confined in three directions by the two arms 47 and 48 and by the near wall of the cap 15.

As previously stated, port 27 is a flash port. Gas issuing from it is conducted by a flash tube back to a point near the casing 10, 15 for ignition. Any known form of flash tube may be used, but I prefer to use for the purpose a portion of a sheet metal housing 50 which covers the pilot tube and the thermally responsive member. As indicated particularly in Fig. 9, this housing may be shaped above the pilot tube 22 to form the sides and top of a flash tube 51 the bottom of which is constituted by the pilot tube itself. This flash tube connects port 27 with port 26 when the apparatus includes the latter port. Hence a flame at port 26 will ignite gas in the flash tube and cause flash ignition of gas issuing from port 27.

In order that the products of combustion from the flames at ports 28 may be discharged and the necessary draft for secondary air flow provided, an opening 52 is formed in the housing by slitting the metal of the housing and turning it up as shown at 53.

For convenience in mounting and demounting the housing 50 it is provided with a bifurcated projection 54 which fits into the peripheral groove 39 in the head of screw 38. The other end of the housing is then swung down and secured to the pilot tube by a drive screw or other fastening 55.

As previously stated, a constant pilot may be provided at the mounted end of pilot arm 22, but I prefer to employ a common source of supply for the two ports 26 and 27, as herein shown, and to ignite gas flowing from the port 26 by some convenient means. This can be done manually and directly of course by holding a lighted match above the port or above an opening 56 formed in housing 50 above the port. I prefer, however, to flange the metal upwardly around opening 56, as shown at 57, and to fit over this flange the lower end of a second flash tube indicated at 58 in Fig. 2. This second flash tube, which may be of any conventional form and will vary in direction and length with installations in different ranges, may extend to any convenient position in the oven or range. For example, its upper end may terminate at the constant pilot commonly employed for ignition of the top burners of the range, such a pilot being conventionally indicated at 59 in Fig. 2. If for any reason it is preferred to use a match for ignition at the upper end of tube 58, that tube may extend to some convenient position exteriorly of the oven or to a position just within the oven door. This means for supplying pilot ignition is simple and convenient, low in first cost and maintenance, and permits the location of the pilot in any desirable position in the oven without regard to the convenience of the operator.

Where electric ignition is desired, the modified construction illustrated in Figs. 11, 12, and 13 may be employed. In this case the pilot tube 22' has no port corresponding to port 26. An L-shaped block 9 of porcelain or other insulation is mounted on pilot arm 22' by means of a bolt 60 or the like. In the angle of this block there is mounted an ignition coil 61 mechanically and electrically connected at one end to a metal plate 62 carried by the block, and connected at its other end to a lead-in wire 63 which may extend through a hole 64 in the upstanding part of the block and be wound around through a notch 65 in the block to make a loop which will lock the wire to the block and prevent it from being moved and thus possibly damaging coil 61, which is somewhat fragile. The clip 40', corresponding to clip 40 in the first described form of the invention, is extended upwardly above thermally responsive member 36 and there carries a screw 66 that is adapted to make electrical contact with plate 62. Member 36 is grounded electrically. The parts described are covered by a housing 50 serving not only to constitute with the pilot arm a flash tube but functioning also as a means of protecting the ignition coil 61 and as a radiation shield for the thermally responsive member.

In the operation of this form of the invention, when the pilot gas is turned on the electric circuit is also completed by suitable means not shown. The parts being in the positions indicated in Fig. 11, which is the "cold" position, coil 61 quickly becomes red hot and gas flowing from a flash port at the outer end of the pilot tube through the flash tube impinges upon coil 61 and is ignited, thereby igniting gas issuing from the flash port. Simultaneously, gas issuing from ports corresponding to ports 28 of the previously described form of the invention is ignited. The thermal member 36 then becomes heated and swings away from pilot tube 22', breaking the circuit through coil 61 and opening the safety valve. After the flash, no flame impinges upon the coil 61 and the coil is furthermore considerably removed from the pilot and oven burners which, of course, is beneficial to its life.

The safety pilot, the pilot arm or tube, the thermally responsive member with its valve actuator, and the sheet metal housing may be identical in the two forms described. In the case of electric ignition, however, the drilling of the port 26 is omitted. This interchangeability of parts in the two forms is obviously of great advantage from a manufacturing standpoint.

In some cases it may be desirable to decrease the height of the pilot assembly and increase its width accordingly. Fig. 14 shows a housing 70 designed for this purpose. It is mounted in the same manner as housing 50 except that the fastening 71 is located at the top instead of at the side as in the case of fastening 55. The housing on one side of the pilot tube forms a cover and radiation shield for the thermally responsive member 36 and on the other side it encloses a space along the pilot tube to constitute a flash tube 72. A flanged opening 73 similar to the flanged part 56, 57 of the first described form of the invention provides access for ignition of gas flowing from a port 74 serving the same purpose as port 27 of the first described form. It will be understood, of course, that in this case the flash port at the outer end of the pilot arm must be located in the same side of that arm as the flash tube, and ports for transferring flame over to the opposite side of the pilot tube must be provided in order that the gas for heating the thermally responsive member may be ignited.

In the apparatus of this invention there are no springs or other parts which are susceptible to damage by oven heat. Consequently the entire unit may be mounted within the oven as indicated by line 75 in Fig. 2 representing an inner wall surface of the latter. The gas conductors may enter the oven from either side or the back, as may be most convenient or economical for any given range and the pilot arm may extend laterally at any angle which will bring it into proper operative relation with the oven burner. The unit is therefore of universal application without modification, it being necessary merely to provide a suitable bracket 37 for connection with the particular burner.

The functions of the apparatus above described will be clear to those skilled in the art. It is to be understood, of course, that the safety valve herein disclosed is employed as one of two or more controls for the oven burner. When it is desired to light the burner, a manual or other control admits gas to one of the conductors 13 or 17 and to the tube 25. If a constant pilot is used for igniting the pilot gas of this unit, a flame at the port 26 becomes available at once. Then quickly thereafter gas issuing from port 27 is ignited by flash and the ports 31 and 28 are ignited substantially simultaneously. Soon thereafter the thermally responsive member 36 becomes heated and deflects, turning rock shaft 42 and causing arm 47 to push ball 19 off its seat. Gas then flows through this valve to the oven burner which is ignited by flame from port 31. If there should be a failure of gas pressure and the flame from ports 28 should be extinguished, thermal member 36 would immediately cool and swing back to "cold" position, thereby causing ball 19 to return to its seat. Main burner gas cannot flow again therefore until the lighting cycle is repeated. The same operating conditions obtain in the case of electric ignition.

In the foregoing description I have necessarily gone somewhat into detail in order to explain fully the particular embodiments of the invention herein illustrated, but I desire it to be understood that such detail disclosures are not to be construed as amounting to limitations except as they may be included in the appended claims.

Having thus described my invention, I claim:

1. In apparatus of the character described, a valve casing adapted to be mounted within an oven adjacent an upright wall thereof, said casing having means for inlet and outlet gas connections and having a valve therein for controlling gas flow between said connections, a pilot arm projecting laterally from said casing, a gas supply connection for said pilot arm adjacent said casing independent of said valve, said pilot arm having a flash port therein at the end remote from said casing, a flash tube extending alongside said pilot arm for directing gas from said flash port back toward said casing, and means at the casing end of said flash tube for there providing ignition.

2. In apparatus of the character described, a valve casing adapted to be mounted in an oven adjacent an upright wall thereof, said casing having means for inlet and outlet gas connections and having a valve therein for controlling gas flow between said connections, a pilot arm projecting laterally from said casing, a gas supply connection for said pilot arm adjacent said casing independent of said valve, said pilot arm having port means adjacent its end remote from said casing, means including an elongated thermally responsive member of the deflecting type disposed alongside said pilot arm, for control of said valve responsive to pilot flame from said port means, flash tube means extending alongside said pilot arm to receive gas from said port means, and means at the opposite end of said flash tube means to provide ignition of gas received from said port means.

FRANK R. HIGLEY.

REFERENCES CITED

The following references are of record in the file of this patent:

UNITED STATES PATENTS

| Number | Name | Date |
|---|---|---|
| 1,381,273 | Blanchard | June 14, 1921 |
| 1,963,957 | Cunningham | June 26, 1934 |
| 1,977,150 | Schmidt | Oct. 16, 1934 |
| 2,077,735 | Beckler | Apr. 20, 1937 |
| 2,080,141 | Leins | May 11, 1937 |
| 2,082,296 | Methudy | June 1, 1937 |
| 2,119,404 | Roberts et al. | May 31, 1938 |
| 2,336,700 | Pepersack | Dec. 14, 1943 |
| 2,355,216 | Guelson | Aug. 8, 1944 |

FOREIGN PATENTS

| Number | Country | Date |
|---|---|---|
| 794,402 | France | Aug. 8, 1935 |